United States Patent [19]

Matsuda

[11] Patent Number: 4,633,274
[45] Date of Patent: Dec. 30, 1986

[54] LIQUID EJECTION RECORDING APPARATUS

[75] Inventor: Hiroto Matsuda, Ebina, Japan

[73] Assignee: Canon Kabushiki Kaisha, Tokyo, Japan

[21] Appl. No.: 716,807

[22] Filed: Mar. 27, 1985

[30] Foreign Application Priority Data

Mar. 30, 1984 [JP] Japan .................................. 59-60594
Mar. 30, 1984 [JP] Japan .................................. 59-60566

[51] Int. Cl.$^4$ ............................................. G01D 15/18
[52] U.S. Cl. .................................. 346/140 R; 400/126; 400/175; 346/139 C
[58] Field of Search ....................... 346/140 R, 139 C; 400/175, 126

[56] References Cited

U.S. PATENT DOCUMENTS

| | | | |
|---|---|---|---|
| 4,074,284 | 2/1978 | Dexter | 346/140 |
| 4,168,533 | 9/1979 | Schwartz | 346/75 X |
| 4,350,448 | 9/1982 | Hanagata | 400/175 X |
| 4,419,678 | 12/1983 | Kasugayama | 346/140 |
| 4,475,116 | 10/1984 | Sicking | 346/140 |
| 4,500,895 | 2/1985 | Buck | 346/140 |

Primary Examiner—Joseph W. Hartary
Attorney, Agent, or Firm—Fitzpatrick, Cella, Harper & Scinto

[57] ABSTRACT

A liquid ejection recording apparatus has a substrate section and a support member. The substrate section has orifices for discharging ink droplets, resistors for generating thermal energy upon application of a voltage, and connector pins. The support member has an ink supply pipe and connector sockets for receiving the connector pins of the substrate section when the substrate section is mounted and supported on the support member. Ink can be supplied from an ink tank or a replaceable ink pack in the support member or can be supplied from a separate location through a pipe. Electrical signals for recording can also be supplied to the substrate section from a remote location through a flexible cable. The substrate section can be easily removed from the support member for replacement.

17 Claims, 9 Drawing Figures

FIG. 1
FIG. 2
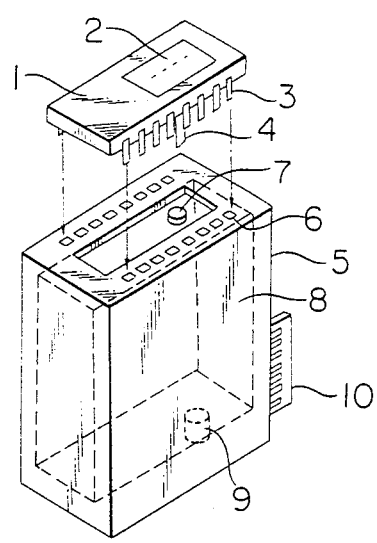
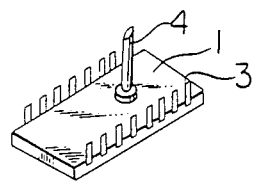
FIG. 3
FIG. 4
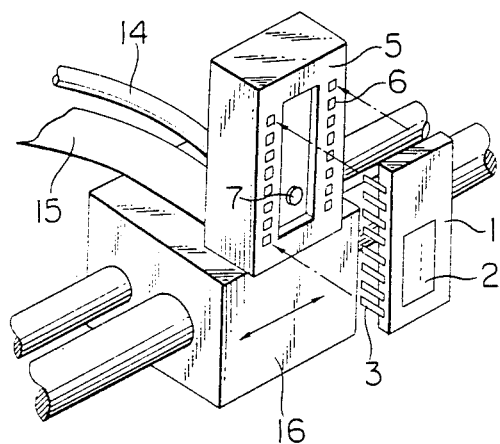
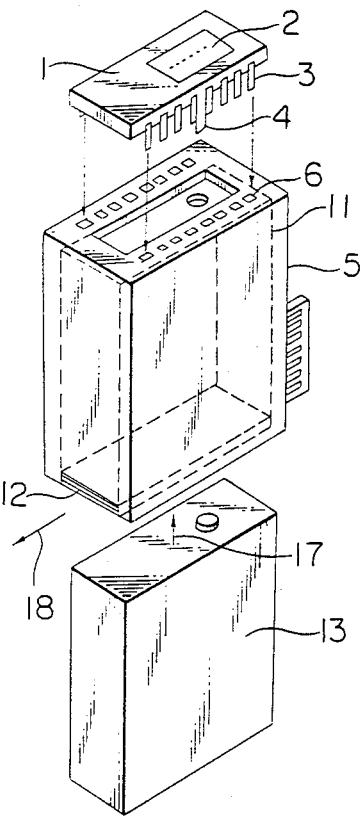

LIQUID EJECTION RECORDING APPARATUS

BACKGROUND OF THE INVENTION

1. Field of the Invention

The present invention relates to a liquid ejection recording apparatus for ejecting a liquid to form flying droplets so as that recording is performed a recording medium.

2. Description of the Prior Art

The ink-jet recording method (liquid ejection recording method) have recently drawn attention in that occurring during recording is negligibly small and that high speed recording is possibly and moreover recording can be accomplished without requiring the special process of fixing images on so called plain paper.

Among, one disclosed in Japanese Patent Application Laid open No. 51837/1979 and DOLS No. 2843064 is different from others in that thermal energy is caused to act on liquid to there by obtain a driving force for liquid droplet discharge. That is, the liquid subjected to the action of the heat energy causes a state change which may result in a sharp increase in volume and by the action force based on this state change, liquid is discharged from an orifice at the end of the recording head portion, whereby flying liquid droplets adhere to the recording medium and thus, recording is accomplished.

A recording head used in the recording method as described above has a liquid discharge section and an electrical-thermal conversion member as a means for generating thermal energy. The liquid discharge section has an orifice for discharge a liquid droplet, and a thermal energy acting portion for acting thermal energy on the liquid and including a liquid flow path communicating with the orifice to discharge liquid droplets.

In a recording apparatus having such a liquid ejection recording head, a recording liquid for recording is supplied from a recording liquid storage portion (ink tank) arranged separately from the recording head through a supply pipe such as a flexible pipe. An electrical signal for driving the electrical-thermal energy conversion member of the recording head is supplied through a flexible cable from a drive circuit separately arranged from the recording head. In this recording apparatus, the recording head is fixed on a carriage. The recording liquid supply pipe is fixed by pressing, screwing or adhesion to a supply pipe connecting member of the recording head. The flexible cable for supplying the electrical signal to the recording head is fixed to the recording head after a wiring pad of the recording head and a connection pad of the flexible cable are pressed together, or by wire bonding, thermal pressing or the like.

In the conventional recording apparatus described above, the recording head is fixed on the carriage, and the recording liquid supply pipe and the electrical signal cable are connected to the recording head. Therefore, the operator cannot remove the recording head from the recording apparatus. For this reason, when the recording head malfunctions during operation, the user cannot remove it from the recording apparatus for replacement. In order to resolve this problem, the recording head must have a high reliability for long term operation. However, it is difficult to provide such a long life recording head. At the same time, manufacture of such a head requires strict quality control and causing a decrease in the manufacturing yield of the recording head and a complex structure of the head, thereby resulting in high cost.

SUMMARY OF THE INVENTION

The present invention has been made in consideration of this and has as its object to provide a liquid ejection recording apparatus which allows easy removal of a recording head from an apparatus main body.

It is another object of the present invention to provide a liquid ejection recording apparatus having a recording head substrate which allows easy mounting/demounting of recording head from a support member and which has a simple construction.

It is still another object of the present invention to provide a liquid ejection recording apparatus wherein a substrate section having an orifice for discharging a liquid and for forming liquid droplets and an energy generation member for generating energy for forming the liquid droplets has connector pins which can be detached from a support member which has a recording liquid supply section and a wiring section for the substrate section, and the support member has connector sockets for receiving the connector pins.

It is still another object of the present invention to provide a liquid jet recording apparatus wherein a substrate section having an orifice for discharging a liquid and for forming liquid droplets and an energy generation member for generating energy for forming the liquid droplets has connector pins which can be detached from a support member which has a recording liquid supply section and a wiring section for the substrate section, and the substrate section is fitted in a groove formed in the support member and is detached by being slid along the groove.

BRIEF DESCRIPTION OF THE DRAWINGS

FIG. 1 is a perspective view showing an embodiment of the present invention;

FIG. 2 is a perspective view of a substrate section shown in FIG. 1; and

FIGS. 3 to 8 are perspective views of other embodiments of the present invention.

DETAILED DESCRIPTION OF THE PREFERRED EMBODIMENTS

Figure 5:
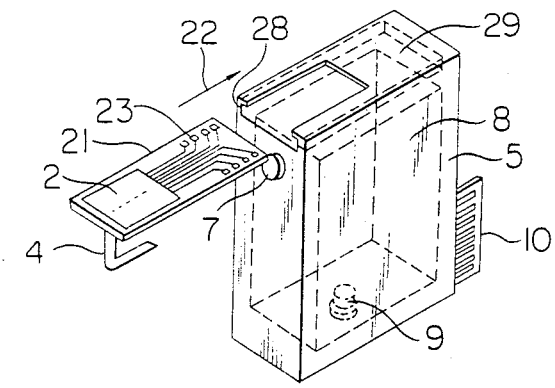

The preferred embodiment of the present invention will be described with reference to the accompanying drawings.

FIG. 1 is a perspective view of an embodiment of the present invention. In a description to follow, the same reference numerals denote the same parts. A package 1 constitutes a substrate section of a recording head according to an embodiment of the present invention. An orifice plate 2 has a number of orifices for discharging liquid or ink droplets. The orifice plate 2 has an ink inlet pipe 4 and a plurality of connector pins (electrode pins) 3 for receiving an electrical signal to control ink discharge and for supporting the package 1 on a support member 5. A substrate is arranged below the undersurface of the orifice plate 2. The substrate includes energy generation elements (e.g., heat-generating elements or piezoelectric elements) such as electrical-thermal conversion elements or electrical-mechanical conversion elements corresponding to the respective orifices, and electrodes for supplying electrical signals thereto. The orifice plate 2 and the substrate are assembled to form a suitable gap therebetween for allowing ink to flow therethrough. A plurality of barriers as pressure buffers are formed below the orifice plate 2 in correspondence with the respective orifices. A hole is formed to extend through the substrate at the substrate portion separated from the barriers and to open into the gap. The ink inlet pipe 4 is inserted into the hole. In this embodiment, the end of the pipe 4 opposite to the substrate side is pointed as in an injection needle. However, this end need not be pointed. The substrate with the orifice plate 2 is assembled into the package 1. The package 1 has a shape similar to that used for packaging a semiconductor device and has a number of electrode wiring layers. In the example illustrated in FIG. 1, the substrate is adhered to a lead frame with the electrode pins 3 and is molded with an epoxy resin to form the package 1. A ceramic package can alternatively used. For example, a ceramic package of thirdip type in which a lead frame is buried or one obtained by adhering electrode pins 3 to edges of a ceramic body metallized with a conductive material can be used. The package can also be one in which the substrate as described above is adhered to a printed circuit board of glass epoxy or the like having electrode pins 3 adhered to its edges and a hole for receiving the ink inlet pipe 4, electrode portions of the printed circuit board and the substrate are bonded by wire bonding, soldering or the like, and the entire assembly is encapsulated with an epoxy resin or the like. A package 1 similar to that shown in FIG. 1 can again alternatively be obtained by assembling a substrate in a resin tape of polyimide or polyester having a plurality of wiring patterns corresponding to the electrode section of the substrate section, the substrate and the tape are bonded by soldering or the like, and then the assembly is adhered to a printed circuit board having electrode pins 3. FIG. 2 is a perspective view showing the package 1 shown in FIG. 1 from the opposite (rear) side, illustrating the mounting state of the ink inlet pipe 4.

In the package 1, the electrode pins 3 are inserted in connector sockets 6 formed in the support member 5. The ink suction pipe 4 is inserted in an ink outlet port 7. The support member 5 has an ink tank 8, an ink inlet port 9 and a connector board 10 in addition to the connector sockets 6 and the ink outlet port 7. The respective connector sockets 6 and the electrode pad of the connector board 10 are connected through wiring patterns.

In this embodiment, the ink outlet port 7 consists of an elastic material such as silicone rubber and does not normally allow leakage of ink. When the ink inlet pipe 4 is inserted into the ink outlet port 7, ink can be supplied from the ink tank 8 in the support member 5 to the side of the package 1. An ink supply section to the side of the package 1 can be another mechanism having a similar function to that described above.

As described above, the package 1 having the electrode pins 3 and the ink inlet pipe 4 can be easily supported on the support member 5 by a single operation of inserting the electrode pins 3 into the connector sockets 6 of the support member 5. At the same time, flow of ink from the ink tank 8 and connection of electrical signals can be reliably performed. The package 1 can also be easily removed from the support member 5 by the opposite operation to that described above. Therefore, when heat-generating elements or electrodes formed on the substrate of the package 1 are disconnected or the orifices clog, the package 1 can be easily replaced with a new package 1. When the diameter of droplets to be formed or the pitch or number of orifices must be changed in accordance with each recording material, the package 1 can be suitably replaced. Thus, the recording apparatus can respond to various need of each user. In addition, since the package 1 has only a minimum number of elements such as orifices, energy-generating elements and electrodes, cost of replacement of packages can be reduced as compared to the case wherein a complete recording head is replaced.

Since the operator of the recording apparatus can easily replace the package 1, the package 1 need not maintain high performance over an extended period of time. In view of this restrictions on the material, construction and manufacturing method of the package 1 are less strict so that an inexpensive package 1 can be provided. Advantage to the operator is considerable since the maintenance cost of the recording apparatus can be substantially reduced.

FIG. 3 shows another embodiment of the present invention. This embodiment is different from that shown in FIG. 1 in that in the former an ink tank 8 as illustrated in FIG. 1 is detachable from a support member 5. A hollow portion 11 is formed in the support member 5 so as to receive therein an ink pack 13. The ink pack 13 consists of a material such as a plastic, aluminum or rubber. The ink pack 13 can be stored in the support member 5 by sliding a slide cover 12 at the bottom of the support member 5 in a direction indicated by arrow 18, inserting it in a direction indicated by arrow 17, and then returning the slide cover 12 to its original position. In this second embodiment, the ink tank in the form of the ink pack 13 can also be replaced, and ink replenishment into the ink tank need not be performed. Contamination of hands or apparatus during ink replenishment can be avoided.

FIG. 4 shows still another embodiment of the present invention wherein the same reference numerals as those in FIG. 1 denote the same parts. In this embodiment, a support member 5 does not have an ink tank 8 or a hollow portion 11 for receiving an ink pack 13. Instead, an ink supply tube 14 is connected to an ink outlet port 7, and a flexible cable 15 is connected to the support member 5 for connecting electrical signals. The support member 5 is fixed on a carriage 16 of a recording apparatus. This embodiment is adopted when an ink tank is located at a position separated from the recording head carriage. As in the earlier embodiments, a package 1 of this embodiment can be easily mounted on or demounted from the support member 5 on the carriage 16.

FIG. 5 shows still another embodiment of the present invention. A substrate section 21 of a recording head has an orifice plate 2 with a number of orifices, an electrode pad 23 for supplying electrical signals to energy-generating elements, and an ink inlet pipe 4. In this embodiment, electrical-thermal conversion elements (heat-generating elements) are used as energy-generating elements. However, piezoelectric elements and other similar elements can also be used as the energy-generating elements. A heat-generating section having heat-generating resistors corresponding to the orifices and barriers for buffering the pressure of the heat-generating section are formed below the substrate section 1. A hole is formed to extend through the substrate section 21 at a portion separated from the barriers. The ink inlet pipe 4 is received into the hole. In this embodiment, the end of the ink inlet pipe 4 opposite to that inserted in the substrate section 1 is pointed as in an injection needle. The substrate section 21 can consist of a material such as glass, silicon, ceramic, metal or printed resin. Heat-generating resistors, wiring electrodes, a protective layer and the like are formed on the substrate section 21 by thin or thick film formation technique or by plating technique. The orifice plate 2 consists of a material such as a metal, glass, resin or ceramic and is spaced slightly apart from the substrate section 21 to define an ink flow path between itself and the substrate section 21. The electrode pad 23 consists of aluminum, gold or an alloy thereof; it preferably consists of gold or an alloy thereof in view of its corrosion and contact resistance.

The substrate section 21 is supported on the support member 5 by being slid in a groove 28 formed in the member 5 in a direction indicated by arrow 22. The support member 5 has an ink tank 8, an ink inlet port 9, and an ink outlet port 7. A contact terminal for connecting the electrode pad 23 to supply electrical signals to the substrate section 21 when the substrate section 21 is inserted in the support member 5 is formed at the surface of the groove 28 on an upper surface 29 of the support member 5. Wiring connected to a connector 10 is bonded to the contact terminal. In this embodiment as well, the ink outlet port 7 consists of an elastic material such as silicone rubber and does not allow leakage of ink therethrough. When the ink inlet pipe 4 is inserted into the port 7, ink can be drawn from the ink tank 8. However, ink can be supplied by another method. The substrate section 21 can be easily mounted on the support 5 by sliding it along the groove 28. In addition, ink supply from the ink tank 8 and connection of the electrical signal wiring can be reliably performed. When the substrate section 21 fails, it can be easily removed from the support member 5 by sliding it in a direction opposite to that indicated by arrow 22 and replaced. When the diameter of droplets or pitch or number of orifices must be changed, the substrate section 21 can be easily replaced with a suitable one.

Since the member which can be detached and replaced is limited to the substrate section 21 having for assembly a minimum number of necessary components such as orifices, heat-generating elements and electrodes, replacement cost upon failure of the recording head can be reduced to a minimum. Furthermore, since the operator of the recording apparatus can easily replace the substrate section 21, the substrate 21 need not maintain high reliability over an extended period of time. In view of this, limitations on the material, construction and manufacturing method of the substrate section can be less strict, and a low-cost substrate section 21 can be provided. The maintenance cost of the recording apparatus can be reduced to a minimum.

Figure 6:
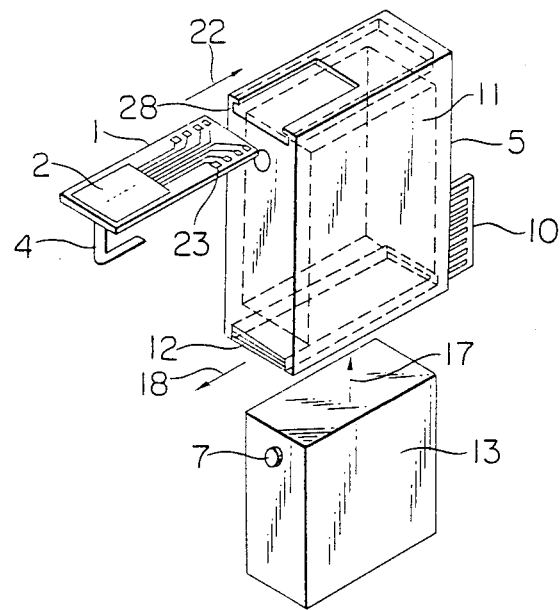

FIG. 6 shows still another embodiment of the present invention. The embodiment shown in FIG. 6 is different from that shown in FIG. 5 in that in the former the portion of an ink tank 8 as shown in FIG. 5 is detachable from a support member 5. The support member 5 has a hollow portion 11 for storing an ink pack 13. The ink pack 13 consists of a material such as a plastic, aluminum or rubber. The ink pack 13 can be stored in the hollow portion 11 by pulling a sliding cover 12 arranged at the bottom of the support member 5 in a direction indicated by arrow 18, inserting the ink pack 13 in the direction indicated by arrow 17, and returning the cover 12 to its original position. In this embodiment, as in the embodiment shown in FIG. 4, an ink tank can be replaced in the form of the ink pack 13. Ink replenishment of the ink tank 8 as in the case of FIG. 5 is not 5 necessary, and contamination of hands and the recording apparatus upon ink replenishment can be prevented.

Figure 7:
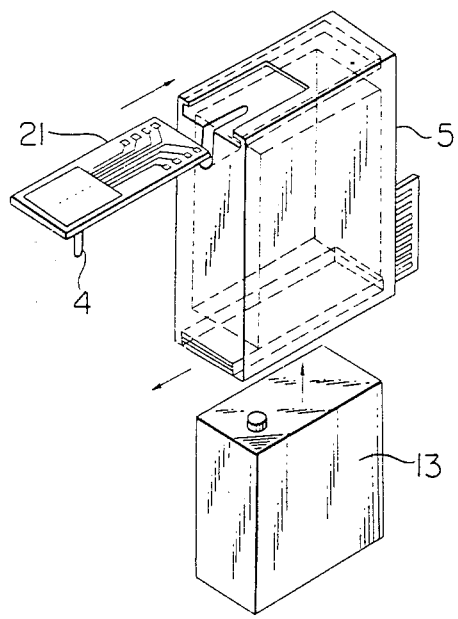

As in the earlier embodiments, FIG. 7 shows still another embodiment wherein a replaceable ink pack 13 is used. In this embodiment, however, the distal end of an ink inlet pipe 4 is formed vertical to the major surface of a substrate section 21. Therefore, the ink pack 13 can be detached without requiring the substrate section 21 to be removed from a support member 5. The ink pack 13 can therefore be replaced with additional ease in this embodiment.

Figure 8:
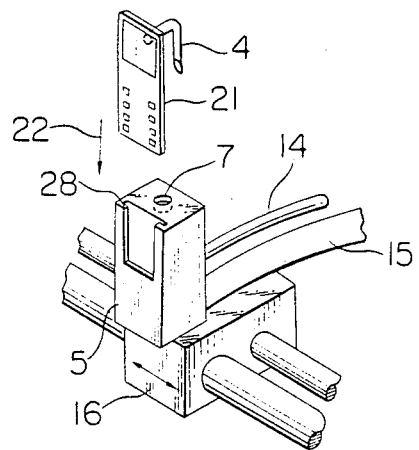

FIG. 8 shows still another embodiment of the present invention. The same reference numerals as in FIG. 5 denote the same parts in FIG. 5. In this embodiment, a support member 5 does not have an ink tank 8 or a hollow portion 11 for receiving an ink pack 13. An ink supply tube 14 is connected to the ink outlet port 7, and a flexible cable 15 for electrical signals is connected to the support member 5. The support member 5 is fixed on a carriage 16 of a recording apparatus. This embodiment is applied in a case wherein an ink tank is located at a position separated from the recording head carriage. As in the earlier embodiments, a substrate section 21 can be easily removed from the support member 5 on the carriage 16.

The above embodiments are described with reference to the case wherein barriers are arranged below the orifice plate. However, if the liquid ejected from orifices does not cause interference between adjacent orifices, the barriers can be omitted. In addition, the barriers can be arranged at the side of the orifice plate or the substrate section. The barriers can be formed of conventional materials by a method such as etching an orifice plate or by using a cured film of a photosensitive film.

Figure 9:
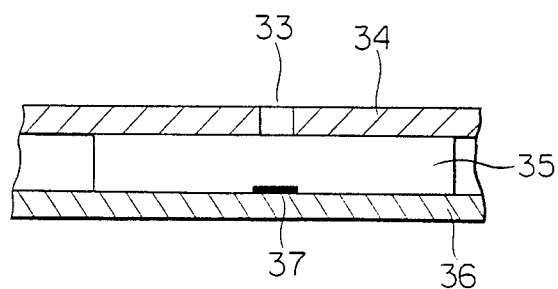
FIG. 9 is sectional view showing the construction of the liquid ejection type recording head.

FIG. 9 shows the construction of the recording head used in the liquid ejection type recording apparatus. Reference numeral 33 denotes an orifice from which flying liquid droplets are discharged, and the flying liquid droplets are generated by an energy generating member 37.

Liquid, as an ink, are supplied by the liquid flow path 35 which is defined an orifice plate 34 and a supporting member 36.

As described above, according to the present invention, when the substrate section of a liquid jet recording head fails, the operator of the recording apparatus can easily replace it without requiring to turn off the recording apparatus for a long period of time. Since the replacement portion is limited to the substrate section and replacement is easy, the substrate section need not have very high reliability over a long period of time. Therefore, a low-cost substrate section can be provided and maintenance cost of the recording apparatus can be reduced. In addition, in accordance with various types of recording materials, a corresponding type of orifice can be mounted at once by the operator.

I claim:

1. A liquid tank containing liquid to be supplied to a recording head mountable thereon, said liquid tank comprising:
   means for mounting said recording head thereon;
   a port through which said liquid is supplied to said recording head; and
   means for transmitting an electrical signal to said recording head.

2. A liquid tank according to claim 1, further comprising:

an electrical terminal for receiving a signal from an external device and for transmitting said received signal to said signal transmitting means.

3. A liquid tank according to claim 1, wherein said signal transmitting means is disposed adjacent to said recording head mounting means.

4. A liquid tank according to claim 1, further comprising an internal liquid containing means within said tank.

5. An apparatus according to claim 1, wherein said recording head has an inlet pipe for being coupled to said tank for receiving liquid therefrom.

6. An apparatus according to claim 5, wherein said inlet pipe has a shape similar to an injection needle.

7. An apparatus according to claim 1, wherein said port comprises an elastic member.

8. An apparatus according to claim 1, wherein said tank has an ink inlet port.

9. A liquid ejection recording apparatus comprising:
a recording head having an orifice for discharging a liquid to form flying liquid droplets, an energy-generating element for generating energy utilized in the forming of said liquid droplets, and a connector pin coupled to said energy-generating element; and,
a liquid tank containing liquid to be supplied to said recording head, said tank including means for mounting said recording head thereon, a port through which said liquid is supplied from said tank to said recording head, and means for transmitting an electrical signal to said connector pin.

10. An apparatus according to claim 9, wherein said recording head is mounted on said liquid tank by a single plug-in action.

11. An apparatus according to claim 9, wherein the connection of said connector pin to said signal transmitting means and the connection of said port for supplying the liquid to said recording head are performed simultaneously with the mounting of said recording head to said liquid tank.

12. An apparatus according to claim 9, wherein said energy-generating element comprises an electrical-thermal conversion element.

13. An apparatus according to claim 9, wherein said energy-generating element comprises an electrical-mechanical conversion element.

14. An apparatus according to claim 9, wherein said recording head has an inlet pipe for being coupled to said tank for receiving liquid therefrom.

15. An apparatus according to claim 14, wherein said inlet pipe includes a tip having the shape of an injection needle.

16. An apparatus according to claim 9, wherein said port comprises an elastic member.

17. An apparatus according to claim 9, wherein said tank has an ink inlet port.

* * * * *